United States Patent
Hanada

(10) Patent No.: US 6,328,277 B1
(45) Date of Patent: Dec. 11, 2001

(54) AUTOMATIC VALVE

(75) Inventor: Toshihiro Hanada, Nobeoka (JP)

(73) Assignee: Asahi Organic Chemicals Industry Co. Ltd., Miyazaki (JP)

( * ) Notice: Subject to any disclaimer, the term of this patent is extended or adjusted under 35 U.S.C. 154(b) by 0 days.

(21) Appl. No.: 09/593,743

(22) Filed: Jun. 14, 2000

(30) Foreign Application Priority Data

Jun. 14, 1999 (JP) .................................................. 11-166531

(51) Int. Cl.[7] .................................................. F16K 31/126
(52) U.S. Cl. .............................. 251/61; 251/325; 251/344
(58) Field of Search ........................... 251/61, 61.2, 340, 251/325, 331, 335.2, 341, 343, 344, 347; 137/601.13; 92/99, 98 R, 100, 96

(56) References Cited

U.S. PATENT DOCUMENTS

| | | | |
|---|---|---|---|
| 2,016,997 | * 10/1935 | Hartke | 251/340 X |
| 3,773,082 | * 11/1973 | Davis | 251/61 X |
| 3,974,849 | * 8/1976 | Dawson | 251/61 X |
| 4,138,089 | * 2/1979 | McCarthy | 251/61 |
| 4,304,390 | * 12/1981 | Kawabata et al. | 251/61 |
| 4,615,353 | * 10/1986 | McKee | 251/61.2 X |
| 4,915,018 | * 4/1990 | Scott et al. | 92/100 X |
| 5,139,225 | * 8/1992 | Olsen et al. | 251/61.2 |
| 5,657,786 | * 8/1997 | DuRoss et al. | 251/331 X |
| 5,979,502 | * 11/1999 | Scott et al. | 251/61.2 X |

* cited by examiner

*Primary Examiner*—Kevin Shaver
*Assistant Examiner*—Eric Keasel
(74) *Attorney, Agent, or Firm*—Burns, Doane, Swecker & Mathis, L.L.P.

(57) ABSTRACT

A compact automatic valve has a cylindrical body with a sleeve inserted to move in the cylindrical body in the axial direction. A first diaphragm, having an annular joint section and an annular protrusion arranged in the outer circumferential section, is joined to one end of the sleeve. A second diaphragm, having an annular joint section and an annular protrusion arranged in the outer circumferential section, is joined to the other end of the sleeve. A first cylindrical diaphragm presser, joined to one end of the cylindrical body, presses the annular protrusion of the first diaphragm and a second cylindrical diaphragm presser, joined to the other end of the cylindrical body, presses the annular protrusion of the second diaphragm. Both the first cylindrical diaphragm presser and the second cylindrical diaphragm presser have a fluid communicating port. A valve member, which is contacted with and separated from the lower end of the sleeve, is arranged at the center of the bottom of the second cylindrical diaphragm presser and alternatively contacts with or separates from the lower end of the sleeve as the sleeve moves axially to close or open the valve. A pair of fluid supply ports respectively communicate with an upper and a lower clearance formed by the cylindrical body, diaphragms and sleeve.

7 Claims, 5 Drawing Sheets

US 6,328,277 B1

AUTOMATIC VALVE

BACKGROUND OF THE INVENTION

1. Field of the Invention

The present invention relates to an automatic valve operated by a fluid. More particularly, the present invention relates to a compact automatic valve, the sealing property of which is high and the flow rate characteristic of which is excellent, which can be used for an ultra-pure water line in the semiconductor industry and also for various chemical lines in the chemical industry.

2. Description of the Related Art

The ultra-pure water line in the semiconductor industry and the various chemical lines in the chemical industry use a large number of pneumatic type automatic valves shown in FIG. 7. As shown in FIG. 7, this pneumatic type automatic valve is composed of a main body section and a drive section. The structure of the main body section is the same as that of a stop valve. That is, when the disk section and the valve seat section are contacted with and separated from each other, the valve can be opened and closed. The drive section includes a cylinder, piston and rod, and the disk section is attached to a forward end of the rod. The structure of the disk section is the same as that of a diaphragm having a film round the disk section and also having an annular protrusion at the center. The annular protrusion is interposed between the main body and the cylinder. Due to the above structure, fluid is prevented from flowing outside and also fluid is prevented from being contaminated with dust when the valve is opened and closed. A bellows can be used instead of a diaphragm.

SUMMARY OF THE INVENTION

However, the above conventional automatic valve is disadvantageous as described below. The profile of the flowing path of the conventional automatic valve is complicated, and further the flowing direction of fluid is suddenly changed, which causes a great pressure loss. Therefore, when it is necessary to provide an automatic valve with a high flow rate, the structure of the above conventional automatic valve is not appropriate for practical use. Further, when it is used for carrying fluid containing slurry, abrasion tends to be caused at the valve seat section, and the sealing performance is deteriorated. Furthermore, according to the structure of the conventional automatic valve, the valve body and the drive section are composed separately from each other. Therefore, the size of the entire valve is increased, and a large space is required for installation. In the drive section, there are provided two sliding sections. Accordingly, resistance is increased in the case of operation of the valve, and it is difficult to instantly transmit the pressure of fluid to the sealing section.

The present invention has been accomplished to solve the above problems of the conventional automatic valve. It is an object of the present invention to provide a compact automatic valve characterized in that: the pressure loss of fluid is low; the flow rate characteristic is so excellent that it can be used for chemicals containing slurry; and the sealing performance is high.

According to the present invention, there is provided an automatic valve comprising: a cylindrical body; a sleeve inserted into the cylindrical body so that the sleeve can be moved in the cylindrical body in the axial direction; a first diaphragm having an annular joint section joined to one end of the sleeve and also having an annular protrusion arranged in the outer circumferential section; a second diaphragm having an annular joint section joined to the other end of the sleeve and also having an annular protrusion arranged in the outer circumferential section; a first cylindrical diaphragm presser for pressing the annular protrusion of one diaphragm, the first cylindrical diaphragm presser being joined to one end of the cylindrical body, the first cylindrical diaphragm presser having a fluid communicating port; a second cylindrical diaphragm presser for pressing the annular protrusion of the other diaphragm, the second cylindrical diaphragm presser being joined to the other end of the cylindrical body, a valve member, which is contacted with and separated from the lower end of the sleeve, being arranged at the center of the bottom of the second cylindrical diaphragm presser, the second cylindrical diaphragm presser having a fluid communicating port; and a pair of fluid supply ports respectively communicating with an upper and a lower clearance formed by the cylindrical body, diaphragms and sleeve.

According to a preferred embodiment of the present invention, one of the first and the second diaphragm is integrated with the sleeve.

According to another preferred embodiment of the present invention, both the first and the second diaphragm are integrated with the sleeve.

According to still another preferred embodiment of the present invention, the fluid communicating ports of the first and the second diaphragm presser are formed on the sides of the respective diaphragm pressers.

The structure of the automatic valve of the present invention is described above. When the automatic valve of the present invention is used, the following excellent effects can be provided.

The sleeve, which is a sealing member, and the diaphragms, which receive the pressure of fluid, are directly joined to each other or integrally formed with each other, and further only one sliding section is used. Therefore, the loss in the transmission of force is small when the valve is operated. Accordingly, the valve can be operated stably and positively, and it is possible to obtain a high sealing performance.

The profile of the flowing path of fluid is simple. Therefore, the flowing direction of fluid is not greatly changed, and it is possible to obtain an excellent flow rate characteristic. Therefore, even when the valve is used for chemicals containing slurry, abrasion is seldom caused in the sealing section. Accordingly, the sealing property can be maintained high over a long period of time.

The automatic valve body and the drive section of the valve are composed integrally with each other. Therefore, the number of parts is small, that is, the valve can be compact.

DESCRIPTION OF THE MOST PREFERRED EMBODIMENT

Figure 1:
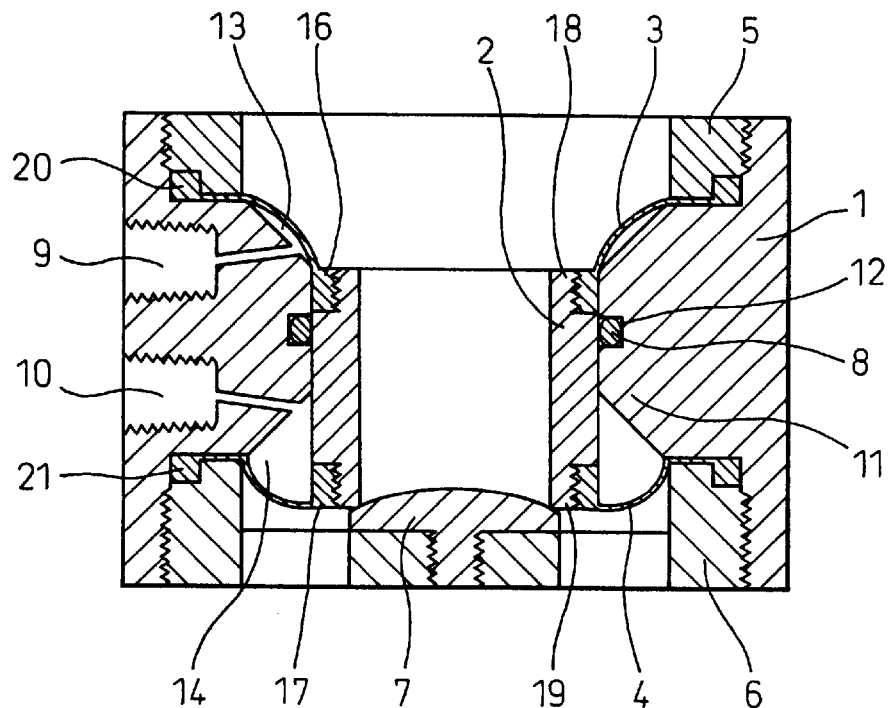
FIG. 1 is a longitudinally cross-sectional view showing a closed state of the automatic valve of the present invention.

In the drawing, reference numeral 1 is a cylindrical body. At the center, inside the cylindrical body, there is provided a reduced diameter section 11 in which a sleeve 2 can be moved in the axial direction, that is, the sleeve 2 is slidably supported by the reduced diameter section 11. On the inner circumferential face of the reduced diameter section 11, there is provided an annular groove 12. O-ring 8 is attached into this annular groove 12. On the other hand, on the outer circumferential side of the cylindrical body 1, there are provided fluid supply ports 9, 10, which respectively communicate with the upper clearance 13 and the lower clearance 14, located on the downstream side and the upstream side of the reduced diameter section 11.

The sleeve 2 is a cylindrical body slidably inserted into the reduced diameter section 11 via O-ring 8, so that the sleeve 2 can freely slide in the axial direction. At the upper end section and the lower end section on the outer circumference of the sleeve 2, there are provided screw sections 18, 19 to which the annular joint sections 16, 17 of the first diaphragm 3 and the second diaphragm 4 are respectively screwed. The lower end section of the sleeve 2 is contacted with and separated from a valve member 7 when the sleeve 2 is moved upward and downward.

The first diaphragm 3 is a doughnut-shaped diaphragm made of fluororesin. At the center of the first diaphragm 3, the annular joint section 16 is arranged. At the outer circumferential edge section of the first diaphragm 3, there is provided an annular protrusion 20, the cross-section of which is formed into a rectangle. The annular joint section 16 of the first diaphragm 3 is screwed to the screw section 18 of the sleeve 2. On the other hand, the annular protrusion 20 of the first diaphragm 3 is engaged with the annular step section formed on the outer circumferential end face of the first diaphragm presser 5, and when the first diaphragm presser 5 is screwed into the inner circumferential end face of the cylindrical body 1, the first diaphragm 3 is interposed between the cylindrical body 1 and the first diaphragm presser 5. Accordingly, the fluid communicating port 9 is communicated with the upper clearance 13 surrounded by the cylindrical body 1, first diaphragm 3 and sleeve 2.

The profile and material of the second diaphragm 4 are the same as those of the first diaphragm 3. Therefore, the explanations of the second diaphragm 4 will be omitted here.

Figure 2:
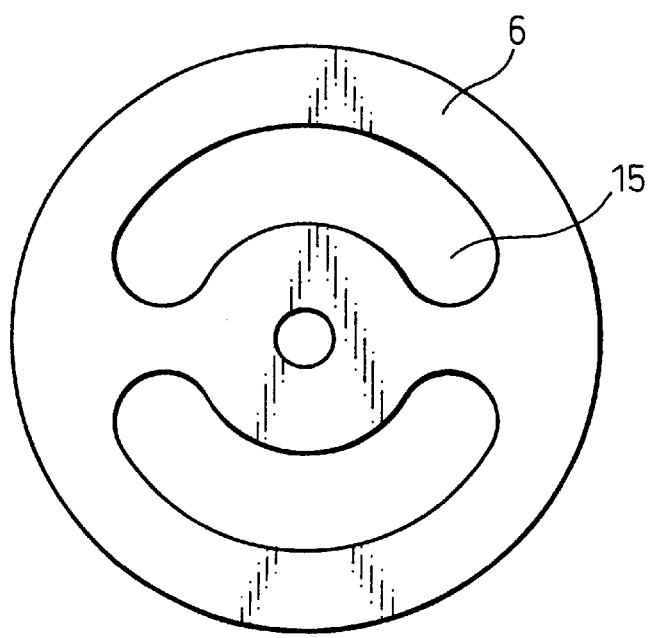
FIG. 2 is a bottom view of the second diaphragm presser of the automatic valve of the present invention.

Reference numeral 6 is a second diaphragm presser. At the center of the bottom section of the second diaphragm presser 6, a valve member 7 is fixed by screwing. Around the valve member 7, there is provided a fluid communicating port 15 as shown in FIG. 2. The method of attaching the valve member 7 is not limited to screwing. It is possible to adopt the method of fusion or integral molding. Also, the number and the profile of the fluid communicating ports are not limited to the specific embodiments.

The structure of the second diaphragm presser 6 is the same as the structure of the first diaphragm presser 5. An annular protrusion 21 arranged in the circumferential section of the second diaphragm 4 is fixed to the cylindrical body 1.

In the same manner as that described before, the fluid communicating port 10 is communicated with a lower clearance 14 surrounded by the cylindrical body 1, second diaphragm 4 and sleeve 2.

In the present invention, it is preferable that the parts such as a main valve body and others are made of a fluororesin such as PTFE, PFA and so forth. However, it is possible to use other plastics such as polyvinyl chloride and polypropylene, and metal. That is, the materials of the main valve body and others are not limited to the specific embodiment. It is preferable that the diaphragm is made of fluororesin such as PTFE and others. However, it is possible to use rubber or metal. That is, the material of the diaphragm is not limited to the specific embodiment.

Next, operation of the embodiment will be explained as follows.

Figure 3:
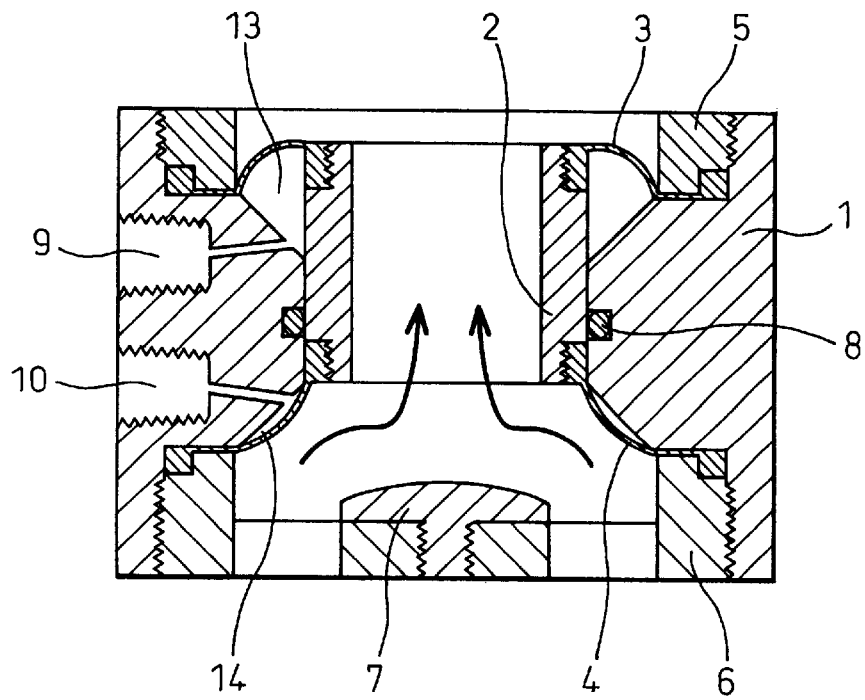
FIG. 3 is a longitudinally cross-sectional view showing an open state of the automatic valve of the present invention.

FIG. 1 is a view showing a closed state of the valve. When fluid such as compressed air is supplied into the upper fluid supply port 9 in the above state, the fluid is introduced into the upper clearance 13. By the pressure of the fluid introduced into the upper clearance 13, the first diaphragm 3 is lifted up. Therefore, the sleeve 2 joined to the first diaphragm 3 is lifted up, and the lower end section of the sleeve 2 is separated from the valve member 7, and the valve is opened as shown in FIG. 3. At this time, the fluid staying in the lower clearance 14 is discharged from the lower fluid supply port 10. The upper clearance 13 and the lower clearance 14 are separated from each other by O-ring 8 via the sleeve 2. Accordingly, even if the sleeve 2 is moved in the vertical direction, no fluid leaks out from one clearance into the other clearance.

On the other hand, when the fluid is supplied from the lower fluid supply port 10 in the state shown in FIG. 3, operation of the valve is conducted on the contrary to the above valve opening operation, that is, the lower end section of the sleeve 2 comes into pressure contact with the valve member 7, so that the valve is set in a closed state. In this connection, the fluid flows upward in the automatic valve in FIG. 3. When the automatic valve is put into practical use, it is possible to make the fluid flow downward in the automatic valve, that is, the direction of the flow of the fluid is not particularly limited.

Figure 4:
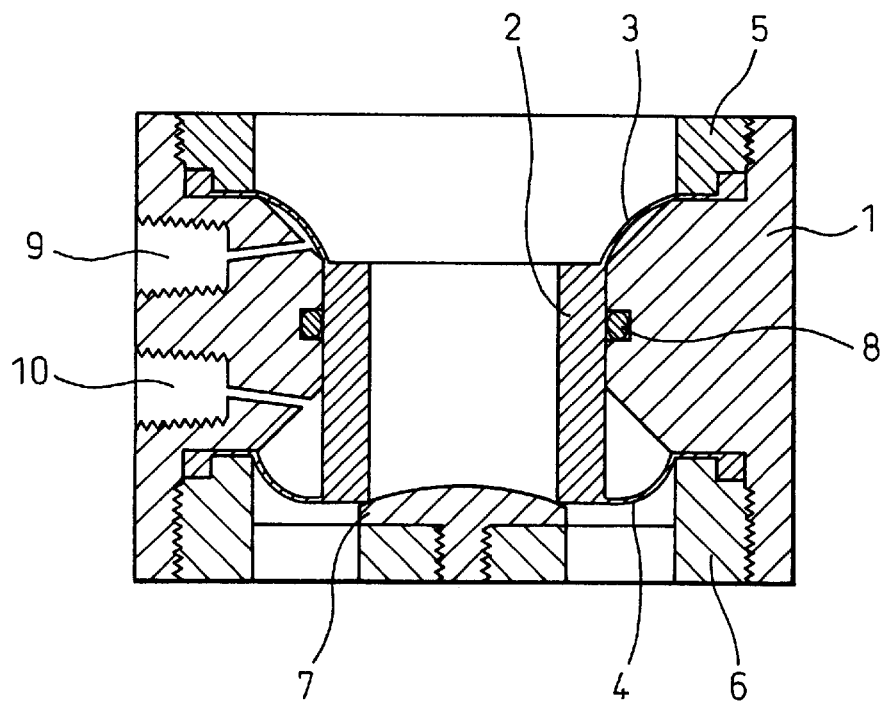
FIG. 4 is a longitudinal cross-sectional view showing a case in which the first diaphragm, second diaphragm and sleeve are integrated with each other in the automatic valve of the present invention.

FIG. 4 is a longitudinal cross-sectional view showing the second embodiment of the present invention. The different point from the above first embodiment is that both the first diaphragm 3 and the second diaphragm 4 and the sleeve 2 are made of fluororesin by means of integral molding. Due to the foregoing, it is possible to avoid the work to join the center of each diaphragm to the sleeve 2, and the valve can be easily assembled. In this connection, it is possible to adopt the structure in which the first diaphragm 3 and the sleeve 2 are integrally molded and the second diaphragm 4 is screwed to the sleeve 2. Operation of the valve of the second embodiment is the same as that of the first embodiment. Therefore, an explanation is omitted here.

Figure 5:
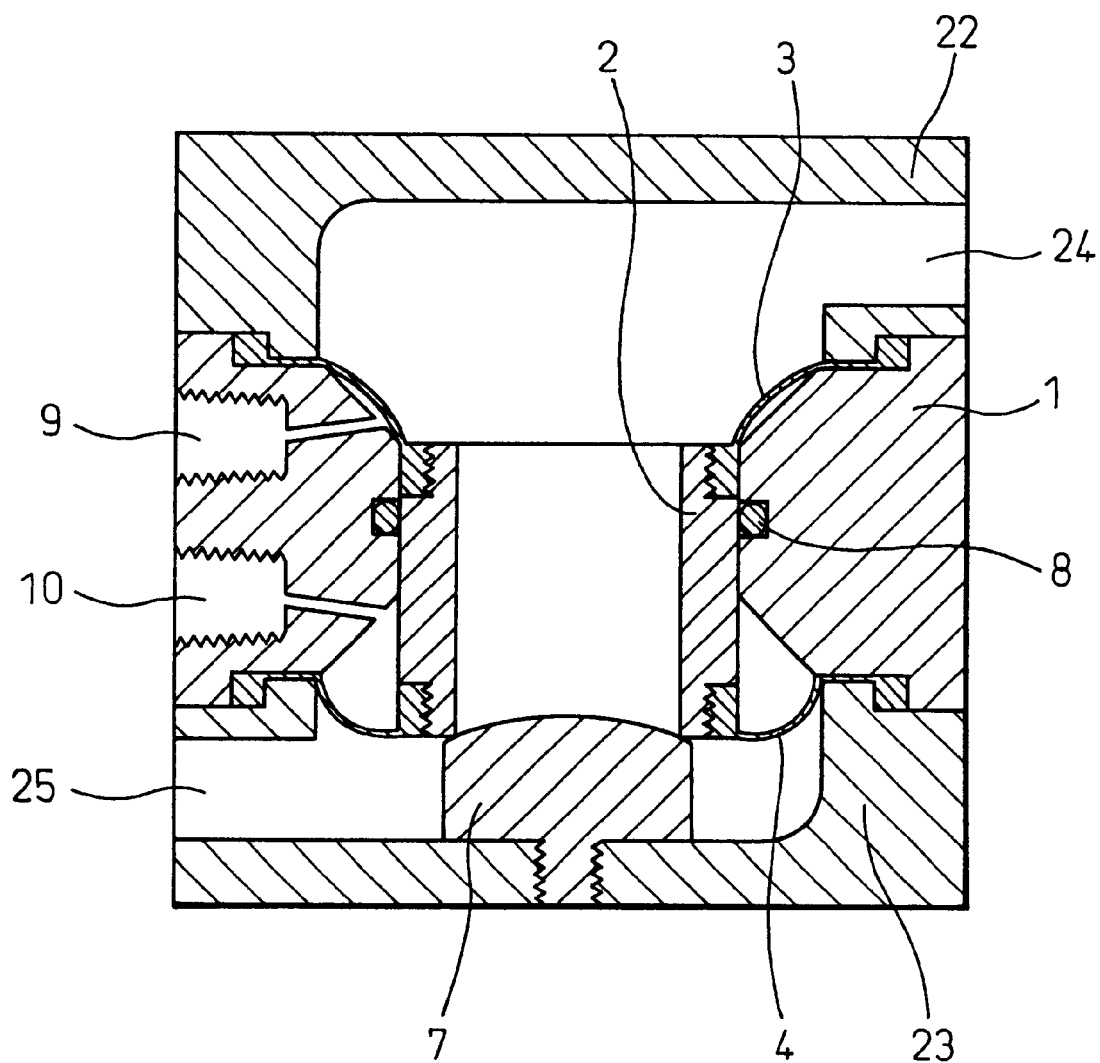
FIG. 5 is a longitudinal cross-sectional view showing a case in which the fluid flowing paths are formed on the sides of the first and the second diaphragm presser in the automatic valve of the present invention.

FIG. 5 is a longitudinally cross-sectional view showing the third embodiment of the present invention. In this embodiment, the fluid communicating ports 24, 25 of the first diaphragm presser 22 and the second diaphragm presser 23 are respectively formed on the sides of the diaphragm pressers. Accordingly, the profile of the flowing path of fluid is curved. In this structure, the cylindrical body 1 and both the diaphragm pressers 22, 23 are integrated into one body by bolts and nuts. Operation of the valve of this embodiment is the same as that of the embodiment described before. Therefore, an explanation will be omitted here.

Figure 6:
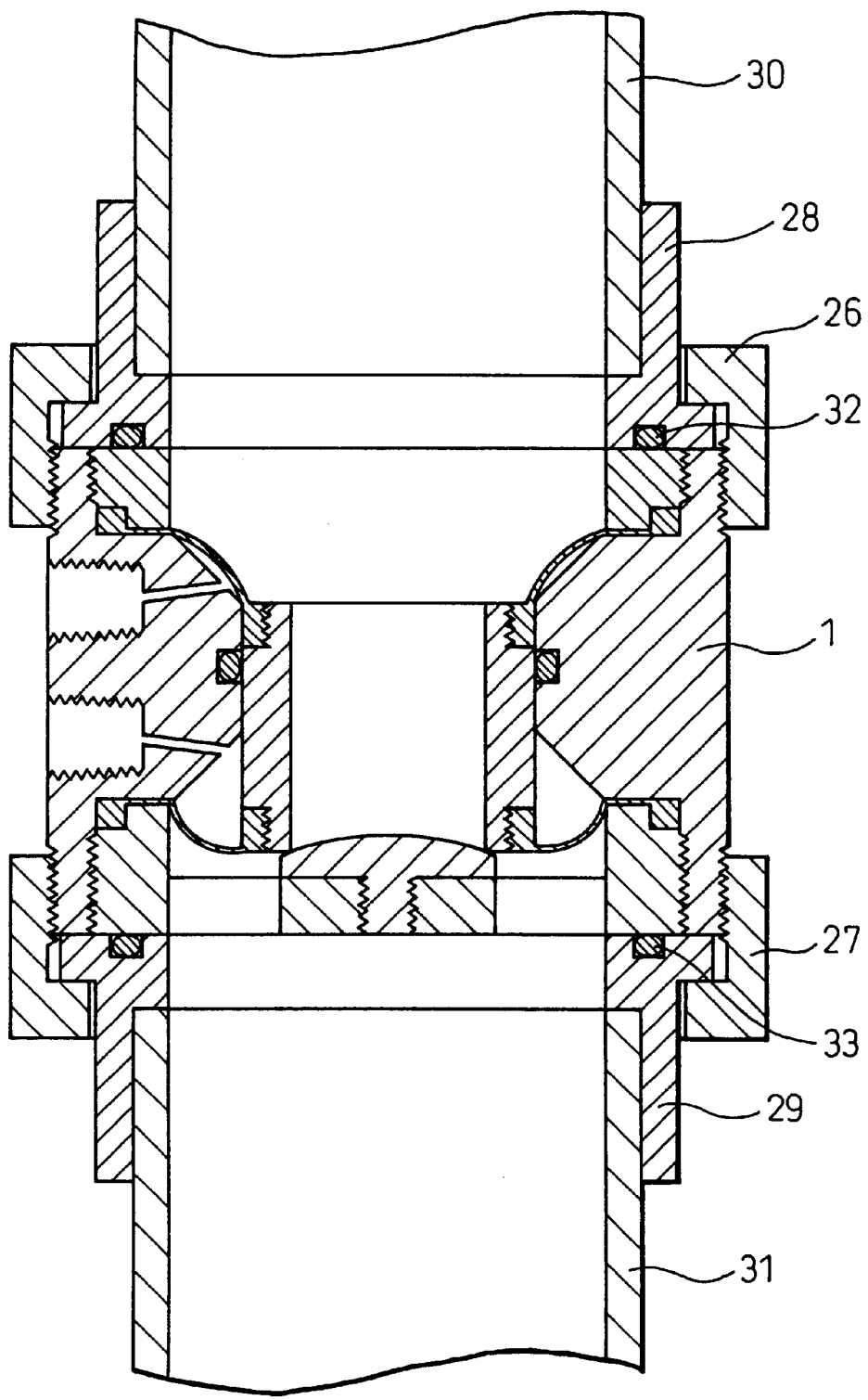
FIG. 6 is a longitudinal cross-sectional view showing a state in which the automatic valve of the present invention is incorporated into piping.
Figure 7:
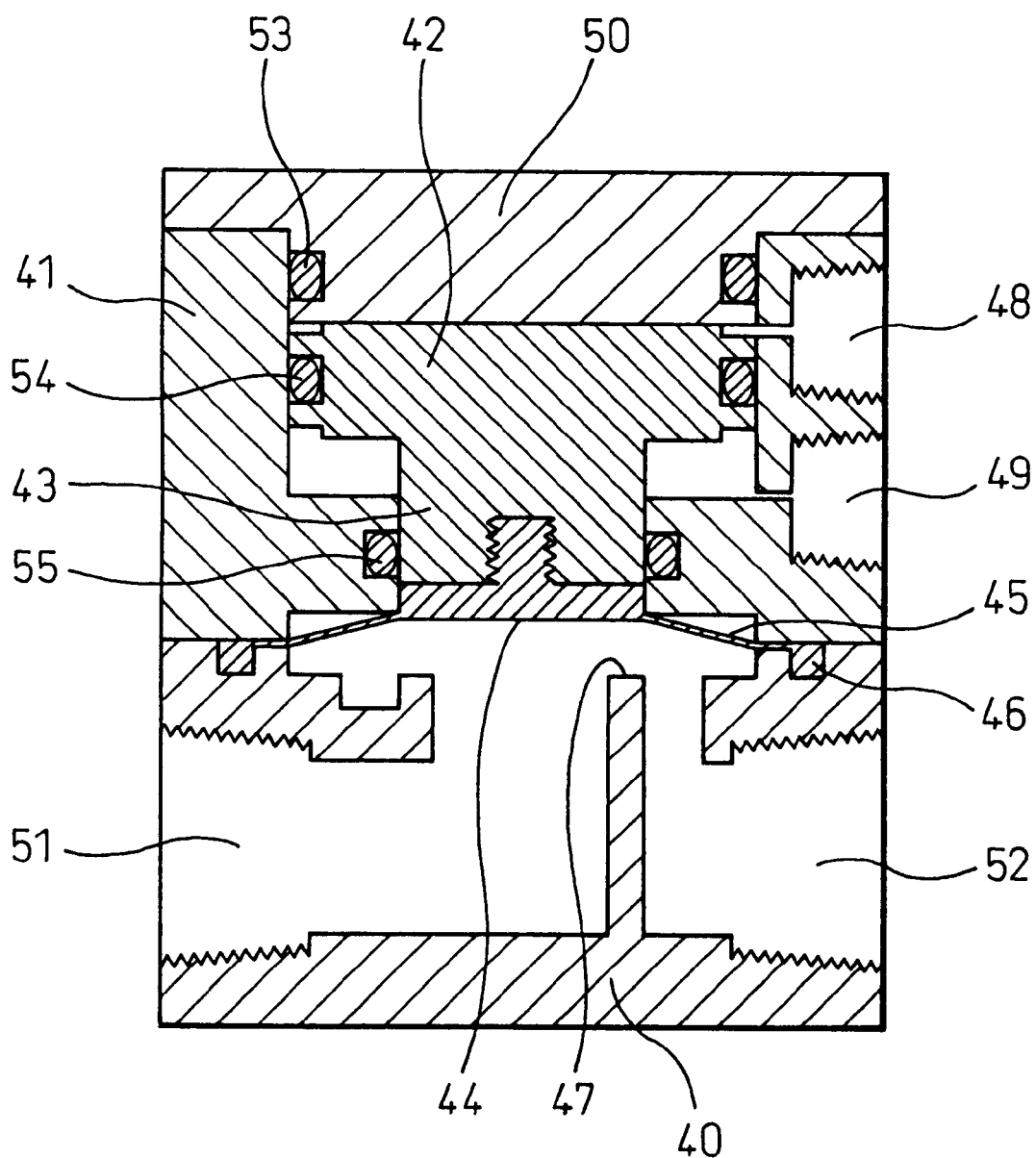
FIG. 7 is a longitudinal cross-sectional view showing a conventional automatic valve.

FIG. 6 is a longitudinally cross-sectional view showing an example of the state in which the automatic valve of the first embodiment is arranged in a piping line. In this structure, the automatic valve and the pipes are connected with each other as follows. The body caps 28, 29 to which the pipes 30 31 are respectively fixed are fixed onto both sides of the automatic valve in such a manner that the cap nuts 26, 27 are screwed to the outer circumferential end sections of the cylindrical body 1 via O-rings 32, 33.

What is claimed is:

1. An automatic valve comprising:

a cylindrical body;

a sleeve inserted into the cylindrical body so that the sleeve can be moved in the cylindrical body in an axial direction;

a first diaphragm having an annular joint section joined to a first end of the sleeve and also having an annular protrusion arranged in an outer circumferential section of the first diaphragm;

a second diaphragm having an annular joint section joined to a second end of the sleeve and also having an annular protrusion arranged in an outer circumferential section of the second diaphragm;

a first cylindrical diaphragm presser for pressing the annular protrusion of one of the first and second diaphragms, the first cylindrical diaphragm presser being joined to a first end of the cylindrical body, the first cylindrical diaphragm presser having a fluid communicating port;

a second cylindrical diaphragm presser for pressing the annular protrusion of the other of the first and second diaphragms, the second cylindrical diaphragm presser being joined to a second end of the cylindrical body;

a valve member, which is alternatively contacted with and separated from the second end of the sleeve, being arranged at the center of the bottom of the second cylindrical diaphragm presser, the second cylindrical diaphragm presser having a fluid communicating port;

and a pair of fluid supply ports, one of the fluid supply ports communicating with an upper clearance formed by the cylindrical body, one of the first and second diaphragms and the sleeve, the other fluid supply port communicating with a lower clearance formed by the cylindrical body, the other of the first and second diaphragms and the sleeve.

2. An automatic valve according to claim 1, wherein one of the first and the second diaphragm is integrated with the sleeve.

3. An automatic valve according to claim 1, wherein both the first and second diaphragms are integrated with the sleeve.

4. An automatic valve according to claim 1, wherein the fluid communicating port of the first diaphragm presser and the fluid communicating port of the second diaphragm presser are formed on the sides of the respective diaphragm presser.

5. An automatic valve according to claim 1, wherein the cylindrical body is a one-piece body having a unitary construction.

6. An automatic valve according to claim 5, wherein the first cylindrical diaphragm presser and the second cylindrical diaphragm presser threadably engage the one-piece body.

7. An automatic valve according to claim 5, wherein both of the fluid supply ports are formed in the one-piece body.

* * * * *